May 23, 1944.  C. J. CARLIN  2,349,703
LICENSE PLATE MOUNTING FOR AUTOMOBILES, ETC
Filed Aug. 6, 1942

INVENTOR.
CLARENCE J. CARLIN
BY Oberlin, Limbach & Day
ATTORNEYS

Patented May 23, 1944

2,349,703

UNITED STATES PATENT OFFICE 2,349,703

LICENSE PLATE MOUNTING FOR AUTOS, ETC.

Clarence J. Carlin, Shaker Heights, Ohio

Application August 6, 1942, Serial No. 453,862

2 Claims. (Cl. 40—130)

This invention relates to improved means of associating a license plate with an automobile, whereby certain desirable advantages are secured while complying with statutory regulations governing the display of such license plates.

It is an object of this invention to provide a mounting for a license plate whereby tampering by unauthorized persons will be prevented though the plate may be easily removed by the owner of the car.

Also it is an object to protect a license plate from the dust and dirt of the street, and to keep same fully readable merely by wiping a covering window.

Another object of this invention is to provide a mounting for a license plate without using any parts, which do not conform to the general stream-line contour of the car body and which therefore create additional resistance to the air when the car is in motion.

And a further object is to provide a mounting which holds a plate in such position that the lamp which illuminates the face of the plate may also be used to light the interior of an associated end compartment of a car.

Further objects and advantages will appear from the specifications of my said invention and from a particular embodiment thereof which I describe and which is disclosed in the drawings wherein.

Figure 1:
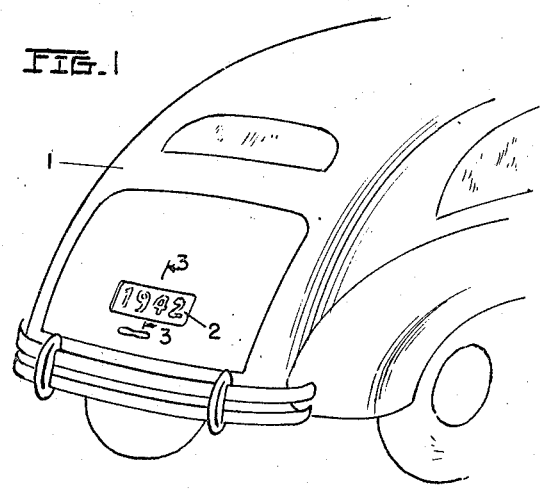
Fig. 1 is a perspective view of the rear of a car showing a license plate mounted according to my invention in the cover of a rear or luggage compartment.
Figure 3:
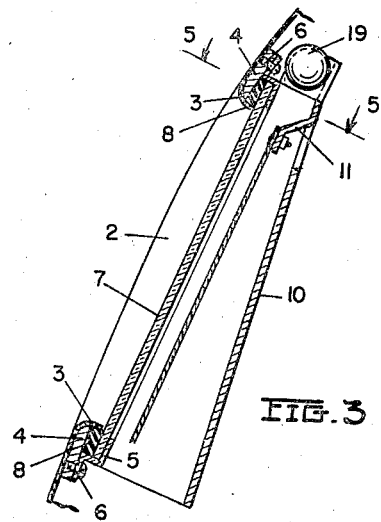
Fig. 3 is a vertical cross-sectional view of the described embodiment of my invention.
Figure 2:
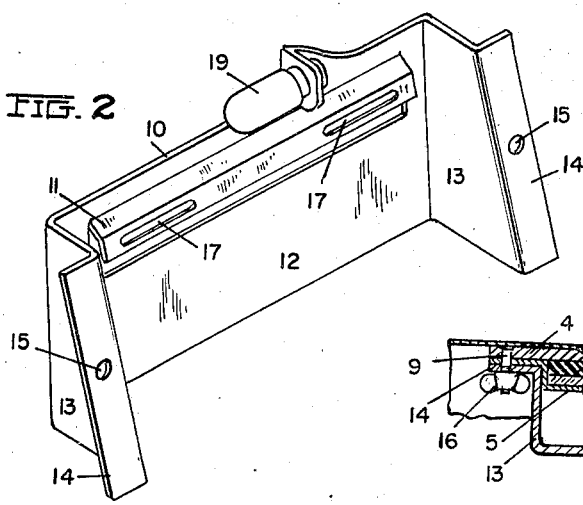
Fig. 2 is a perspective view of a detached supporting member provided with an integral bracket for the mounting of a license plate.
Figure 6:
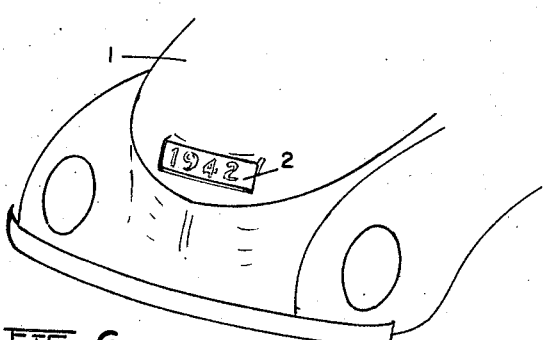
Fig. 6 is a perspective view of the front of a car showing a license plate mounted according to my invention in the cover of the front or engine compartment of a car.

Referring to the drawing, the disclosed embodiment of my invention will now be described. As shown in Figs. 1 and 6 my invention may be associated with the baggage compartment at the rear of a car and with the engine compartment in the front. Preferably I install my invention in the cover of such a compartment, though if desired it is equally effective when installed in an appropriate position in a fixed body wall of the compartment. In a car as generally indicated at 1 an opening 2 of suitable size and proper location is cut in a wall of a compartment or in its cover. The marginal edges of the opening 2 will preferably be turned inwardly as at 3, and about the opening 2, fitting within the turned in edge portion 3, is a metal stiffening member 4 which is attached to the metal wall surrounding the opening 2, preferably by welding thereto. Clips, or channels, 5 are attached to the member 4, as by screws 6, and hold a transparent sheet 7 of glass or the like in a position closing the opening 2. A gasket 8 of rubber or the like inserted between member 4 and sheet 7, resiliently supports the latter. Studs 9, the projecting ends of which are provided with screw threads, are fixedly mounted through the member 4, one being positioned at each end of the opening 2, for the attaching of a supporting structure for a license plate as will hereinafter be described.

A structure 10, for the support of a license plate, and more or less box-like in form, is shaped of sheet metal with vertical back wall 12 and end walls 13. The edges of end walls 13 are bent outwardly to form wings 14 each of which is provided with an orifice 15 to receive a stud 9. A swing nut 16 mounted on the threads of stud 9 supports the structure 10 in position back of the opening 2.

A portion of the rear wall 12 of the supporting structure 10 is struck inwardly to form a bracket 11 provided with slots 17 for the attachment of a license plate by short bolts 18 in the usual manner. On the upper edge of the back wall 12 is mounted a socket for a bulb 19 which is so positioned as to illuminate the compartment in which it is mounted and throw a beam downward upon the exposed face of the license plate.

Figure 4:
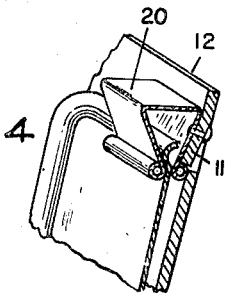
Fig. 4 shows an alternative form of bracket for the support of a license plate.
Figure 5:
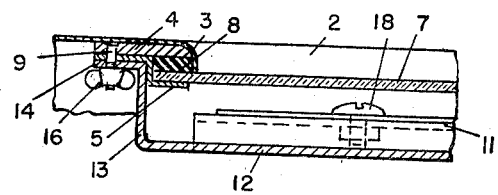
Fig. 5 is a horizontal cross-sectional view of an end of my invention, showing the mounting of the transparent sheet, the association of the supporting member therewith and the attachment of the license plate on the bracket of such supporting member.

Instead of mounting a license plate by short bolts 18 through the slots 17 in the usual manner, clips 20 may be attached to the bracket 11 as shown in Fig. 4. A license plate may be slipped into such clips which will securely hold same. Inasmuch as the plate and its mounting structure is within a compartment which may be locked, such mounting will be sufficient to insure against tampering.

Preferably this improved mounting will be placed in the extreme end portion of the cover, or lid, of a trunk compartment as shown in Fig. 1 or of an engine compartment as shown in Fig. 6. Since both of these compartments are kept locked, the convenient arrangement of the mounting will be sufficient as it is effectual and is protected from tampering.

To the accomplishment of the recited and related ends, said invention, then consists of the means hereinbefore fully described and hereinafter fully pointed out in the claims. But other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In an automative vehicle having an end compartment and a door giving access to such compartment, an opening in said door closed by a transparent sheet, an improved novel mounting for a license plate comprising a supporting plate mounted adjacent such opening and in substantially parallel relation with the transparent sheet supported in said opening, said supporting plate being provided with end portions bent toward such opening whereby it may be detachably mounted on said door and being provided with an integral offset bracket whereto a license plate may be demountably attached and also being provided with another integral off-set portion operative to support a lamp in a position to illuminate the face of the license plate and the interior of the compartment.

2. In an automotive vehicle having an end compartment with an opening in the wall thereof closed by a transparent sheet, an improved novel mounting for a license plate comprising a supporting plate mounted adjacent such opening and in substantially parallel relation with said transparent sheet, said supporting plate being provided with end portions bent toward such opening whereby it may be detachably mounted on the compartment wall and being provided with an integral off-set bracket whereto a license plate may be demountably attached in such manner that said license plate extends in a plane substantially parallel to said transparent sheet, said supporting plate also being provided with another integral off-set portion at the upper edge of said supporting plate, said last named portion being operative to support a lamp in a position to illuminate the face of the license and the interior of the compartment, as described.

CLARENCE J. CARLIN.